(12) United States Patent
Ohrai (10) Patent No.: US 8,616,578 B2
(45) Date of Patent: Dec. 31, 2013

(54) OCCUPANT PROTECTION APPARATUS

(75) Inventor: Junichi Ohrai, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 3 days.

(21) Appl. No.: 13/402,302

(22) Filed: Feb. 22, 2012

(65) Prior Publication Data
US 2012/0217774 A1 Aug. 30, 2012

(30) Foreign Application Priority Data
Feb. 25, 2011 (JP) ................ 2011-040946

(51) Int. Cl.
*B60R 21/18* (2006.01)

(52) U.S. Cl.
USPC ................................................ 280/733

(58) Field of Classification Search
USPC ........ 280/733, 730.2, 806; 297/480, 477, 478
See application file for complete search history.

(56) References Cited

U.S. PATENT DOCUMENTS

| | | | | |
|---|---|---|---|---|
| 6,010,150 A | * | 1/2000 | Amann | 280/730.2 |
| 6,378,898 B1 | * | 4/2002 | Lewis et al. | 280/733 |
| 6,447,011 B1 | * | 9/2002 | Vollimer | 280/806 |
| 7,481,452 B2 | * | 1/2009 | Itoga et al. | 280/733 |
| 8,286,995 B2 | * | 10/2012 | Shibayama et al. | 280/730.2 |
| 2011/0204605 A1 | * | 8/2011 | Rathmann-Ramlow et al. | 280/733 |

FOREIGN PATENT DOCUMENTS

| | | |
|---|---|---|
| JP | 4-50052 | 2/1992 |
| JP | 2007-223524 | 9/2007 |

* cited by examiner

*Primary Examiner* — Drew Brown
(74) *Attorney, Agent, or Firm* — Smith, Gambrell & Russell, LLP (57) ABSTRACT

An occupant protection apparatus includes: aside airbag device including an airbag that deploys in a space between a side surface on an outer side in a vehicle width direction of a seat and a passenger compartment inner wall facing the side surface; and a seat belt device including a seat belt that restrains an occupant. The side airbag device is provided at a side portion on an outer side in the vehicle width direction of the seat and on an inner side in the vehicle width direction of the seat belt. The airbag is ejected outward in the vehicle width direction at a vehicle side impact, secures a space between the passenger compartment inner wall and the occupant, and presses the seat belt outward in the vehicle width direction to apply a tension to the seat belt.

18 Claims, 5 Drawing Sheets

OCCUPANT PROTECTION APPARATUS

CROSS-REFERENCE TO RELATED APPLICATIONS

The present application claims priority from Japanese Patent Application No. 2011-040946 filed on Feb. 25, 2011, the entire contents of which are hereby incorporated by reference.

BACKGROUND OF THE INVENTION

1. Field of the Invention

The present invention relates to an occupant protection apparatus, and particularly to a side airbag device that is deployed in the event of a vehicle side impact and a seat belt device.

2. Description of Related Art

In the related art, when a vehicle is subjected to a high impact on a side thereof (hereinafter referred to as "in the event of side impact"), a side door or a pillar may be deformed inwardly in a vehicle width direction due to the impact load in the event of side impact, and a door trim or a pillar trim forming an inner wall of a passenger compartment may come into the passenger compartment and come in direct contact with an occupant. Moreover, an inward external force in the vehicle width direction is applied by the impact load in the event of side impact, and an occupant seated on a seat may break through a seat belt restraint away outward in the vehicle width direction. In order to address such a situation, occupant protection apparatuses including a side airbag device that is deployed near an inner wall of a passenger compartment in the event of side impact and a seat belt device have been proposed.

For example, Japanese Patent Application Laid Open (JP-A) No. H4-50052 discloses an airbag device provided on a side face of a seat back facing a side door as an occupant protection apparatus in the event of side impact. Specifically, the airbag device of JP-A No. H4-50052 forms a shock-absorbing part by deploying an airbag from the seat back toward the side door and also forms an occupant protection part by deploying an airbag from the seat back in a direction inclining toward the vehicle front. The airbag device of JP-A No. H4-50052 thus prevents deformation of the side door by absorbing the impact by the shock-absorbing part formed by the deployed airbag.

In addition, JP-A No. 2007-223524 discloses an airbag device provided for a buckle device disposed on a side of a seat to lock an end of a lap belt part included in a seat belt device. In the airbag device of JP-A No. 2007-223524, an airbag is deployed and inflated in a gap between a buckle of the buckle device, the lap belt part and a seat part of the seat. Specifically, in the airbag device of JP-A No. 2007-223524, the airbag is deployed from an upper part of the vehicle in a direction inclining toward the front. In addition, the airbag is inflated in the vertical direction to such an extent that the airbag presses the lap belt part upward and inflated in the width direction until the airbag comes in contact with a side of the lumbar of the occupant. Moreover, the airbag device of JP-A No. 2007-223524 eliminates loosening of the lap belt part and eliminates the gap between the lap belt part, the buckle and the seat part to increase restraint of the lap belt part to the occupant.

However, although JP-A No. H4-50052 considers the case where an inner wall of the passenger compartment comes into the passenger compartment and comes in contact with the occupant as a result of the impact load at the time of side impact is considered, improvement is required for a case where an occupant breaks through the seat belt restraint away outward in the vehicle width direction. On the other hand, although JP-A No. 2007-223524 considers the case where an occupant breaks through the seat belt restraint away outward in the vehicle width direction, improvement is required for the case where an inner wall of the passenger compartment comes into the passenger compartment and comes in contact with the occupant. However, if it is attempted to overcome the drawbacks to be improved as described above in each of JP-A No. H4-50052 and JP-A No. 2007-223524, it is necessary to additionally provide another airbag device or newly improve the seat belt device.

SUMMARY OF THE INVENTION

In view of the aforementioned circumstances, the present invention aims to provide an occupant protection apparatus capable of protecting an occupant from the inner wall of the passenger compartment coming into the passenger compartment as a result of the impact load in the event of side impact and preventing the occupant from breaking away from the seat by increasing the restraint of the seat belt.

In order to achieve the above objects, an aspect of the present invention provides an occupant protection apparatus comprising: a side airbag device including an airbag that deploys in a space between a side surface on an outer side in a vehicle width direction of a seat and a passenger compartment inner wall facing the side surface at a vehicle side impact; and a seat belt device including a seat belt that restrains an occupant seated on the seat. The side airbag device is provided at a side portion on an outer side in the vehicle width direction of the seat and on an inner side in the vehicle width direction of the seat belt, and the airbag is ejected outward in the vehicle width direction at a vehicle side impact, deploys in the space to secure a space between the passenger compartment inner wall and the occupant, and presses the seat belt outward in the vehicle width direction to apply a tension to the seat belt.

Preferably, the airbag, when deployed, should come into contact with the passenger compartment inner wall and bring the pressed seat belt into contact with the passenger compartment inner wall to hold the seat belt between the airbag and the passenger compartment inner wall.

Preferably, the passenger compartment inner wall should include a receiving part that receives a load applied by the airbag in contact thereto. Preferably, the receiving part should be made of a shock absorbing material for absorbing an impact load at a vehicle side impact.

Preferably, the seat should include a seat cushion having a seat bearing face part and a side support part of the seat bearing face part, and the side airbag device should be disposed at a side portion on an outer side in the vehicle width direction of the seat bearing face part or the side support part. It is preferable that a deployment center of the airbag included in the side airbag device should be disposed lower than the seat bearing face part or the side support part in the passenger compartment.

According to the present invention, it is possible to provide an occupant protection apparatus that realizes, with one side airbag device, the functions allowing protection of an occupant from an inner wall of a passenger compartment coming into the passenger compartment as a result of an impact load in the event of side impact and protection of an occupant so that the occupant does not break away from a seat by increasing the restraint of a seat belt.

DETAILED DESCRIPTION OF THE PREFERRED EMBODIMENTS

An embodiment of the present invention will be described below with reference to the drawings.

Figure 1:
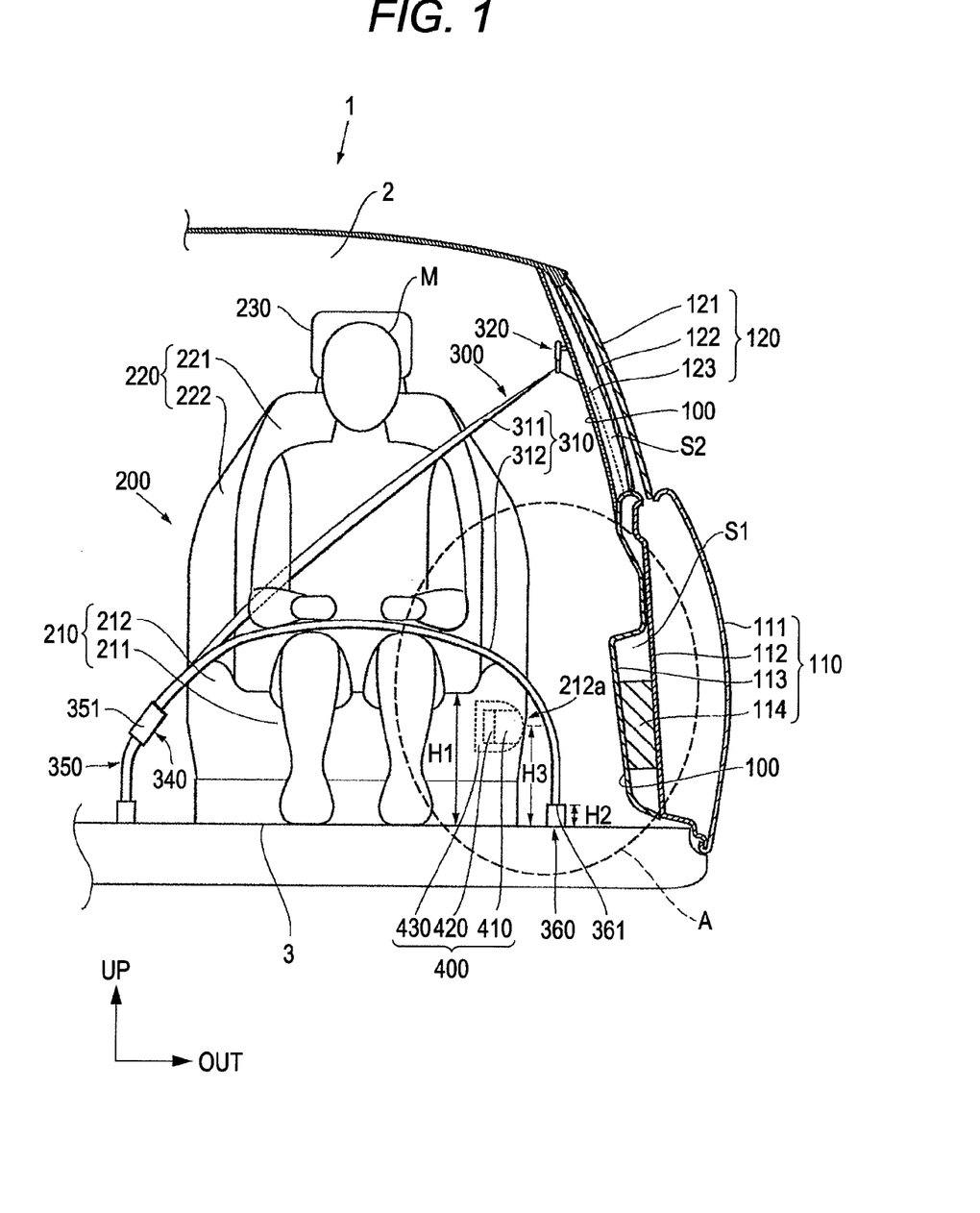
FIG. 1 is a front view schematically showing a structure inside a passenger compartment of a vehicle in which an occupant protection apparatus according to an embodiment of the present invention is employed in a state before a side airbag device is activated as viewed from a front side of the vehicle.
Figure 2:
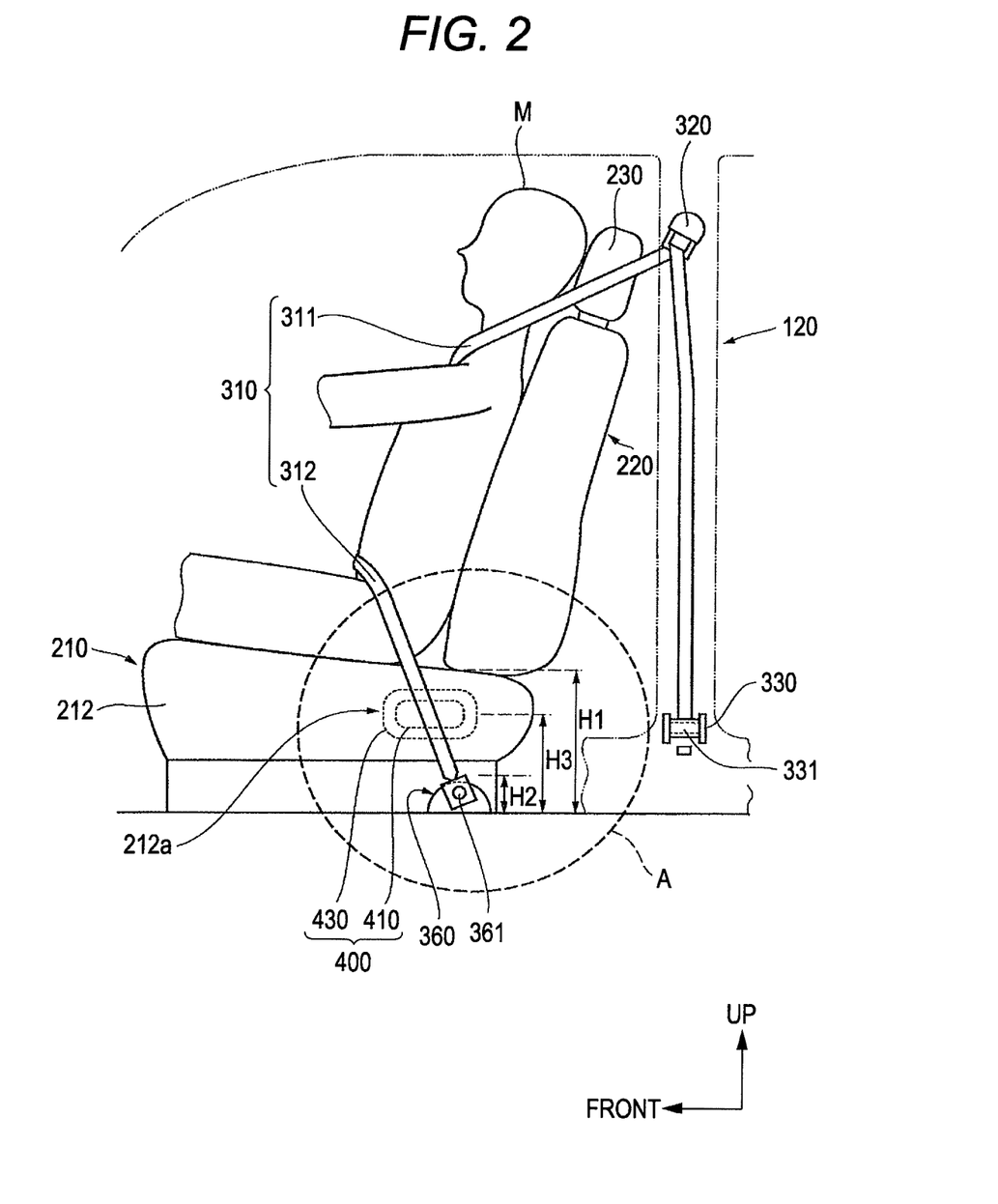
FIG. 2 is a side view schematically showing the structure inside the passenger compartment of the vehicle in which the occupant protection apparatus according to the embodiment of the present invention is employed in the state before the side airbag device is activated as viewed from a side of the vehicle.

First, a structure inside a passenger compartment 2 of a vehicle 1 in which an occupant protection apparatus according to an embodiment of the present invention employed will be described with reference to FIGS. 1 and 2. FIG. 1 is a front view schematically showing a structure inside the passenger compartment 2 of the vehicle in which the occupant protection apparatus according to the embodiment of the present invention is employed in a state before a side airbag device 400 is activated as viewed from a front side of the vehicle. FIG. 2 is a side view schematically showing the structure inside the passenger compartment 2 of the vehicle in which the occupant protection apparatus according to the embodiment of the present invention is employed in the state before the side airbag device 400 is activated as viewed from a side of the vehicle.

In the following description, the vehicle 1 is a right-hand drive passenger car, and a front passenger seat of the vehicle 1, that is, a left front seat in the passenger compartment 2 is a seat 200, which will be described later. In addition, the direction of forward movement of the vehicle 1 is referred to as the front, and the directions are defined based on the front and referred to as frontward, backward, upward, downward, leftward, rightward, and the like. The leftward direction of the seat 200 is outward in the vehicle width direction and the rightward direction thereof is inward in the vehicle width direction.

The passenger compartment 2 refers to an interior space of the vehicle 1. Among wall surfaces forming the passenger compartment 2, one side wall surface corresponds to a passenger compartment inner wall 100 and one lower wall surface corresponds to a vehicle floor 3. In addition, the seat 200 on which an occupant M is seated and an occupant protection apparatus for protecting the occupant M in the event of side impact are disposed in the passenger compartment 2. The occupant protection apparatus includes a seat belt device 300 that restrains the occupant Min the seat 200 and a side airbag device 400 that is deployed in the event of side impact.

The passenger compartment inner wall 100 has an inner wall surface standing upright on the side forming the passenger compartment 2 on the near side of the seat 200. In other words, the passenger compartment inner wall 100 has an inner wall surface facing a side surface on the outer side in the vehicle width direction of the seat 200. Specifically, the passenger compartment inner wall 100 has wall surfaces of front doors 110 and center pillars 120 of the vehicle 1 inside of the passenger compartment 2.

The front doors 110 each has an outer panel 111 defining a side outer appearance of the vehicle 1, an inner panel 112 attached inside of the outer panel 111 and forming a framework of the front door 110, and a door trim 113 attached inside of the inner panel 112. Thus, the outer panel 111, the inner panel 112 and the door trim 113 are arranged in this order from the outer side toward the inner side in the vehicle width direction in the front door 110.

The outer panel 111 and the inner panel 112 can be formed of known materials such as steel plates and in a known structure. Marginal edges of the outer panel 111 and the inner panel 112 are joined in a state where the outer panel 111 and the inner panel 112 are assembled so that a substantially enclosed region is formed therebetween. In the region, a number of internal components such as a window glass (not shown) of the front door 110, a mechanism for ascending and descending the window glass (not shown) and a mechanism for locking the front door 110 are assembled. The window glass is positioned above the front door 110 when the window glass is closed in the vehicle 1. In FIG. 1, the window glass is not illustrated but the center pillar 120 positioned behind the window glass is illustrated for convenience of description.

The door trim 113 is an interior member facing the passenger compartment 2 and is attached so as to cover substantially the entire surface of the inner panel 112. The door trim 113 can be formed of a known material such as synthetic resin and in a known structure and is locked at the marginal edges so that an enclosed region S1 is formed between the door trim 113 and the inner panel 112. In the present embodiment, the door trim 113 also serves as the passenger compartment inner wall 100 forming the passenger compartment 2.

An energy absorption (EA) member 114 is arranged in the enclosed region S1 formed between the door trim 113 and the inner panel 112. The EA member 114 can be formed of a known resin material such as polypropylene foam or urethane having shock absorbing performance. A known structure can also be used for the structure of the EA member 114. For example, the EA member 114 formed to have a truss structure or a honeycomb structure can be disposed to stand upright from a surface of the door trim 113 facing the inner panel 112 outward in the vehicle width direction.

In particular, the EA member 114 of the present embodiment is disposed to fill a lower portion of the enclosed region S1. Specifically, in the present embodiment, the EA member 114 fills a part of the enclosed region S1 corresponding to a height H3 and a position in the front-back direction of a seat bearing face side portion 211a of the seat 200, which will be described later. The EA member 114 serves to absorb and disperse the impact load applied to the vehicle 1 in the event of side impact and to buffer an external force caused by the impact load even when the inner panel 112 is deformed inwardly in the vehicle width direction as a result of the impact load and cannot withstand the external force from the outer side toward the inner side in the vehicle width direction.

The center pillar 120 includes an outer panel 121, an inner panel 122 and a pillar trim 123, which are similar to the outer panel 111, the inner panel 112 and the door trim 113, respectively, of the front door 110. The pillar trim 123 also serves as the passenger compartment inner wall 100 forming the passenger compartment 2 similarly to the door trim 113.

A region S2 is provided between the inner panel 122 and the pillar trim 123 similarly to the enclosed region S1 of the front door 110. The EA member 114 is also disposed in the region S2 similarly to the front door 110. The EA member 114 disposed in the center pillar 120 serves to absorb and disperse the impact load applied in the event of side impact and buffer an external force caused by the impact load even when the inner panel 122 is deformed inwardly in the vehicle width direction as a result of the impact load. In addition, a retractor 330 and the like constituting the seat belt device 300, which will be described later, are accommodated in the region S2.

The seat 200 is mounted on the vehicle floor 3 of the passenger compartment 2. The seat 200 can be formed of a known material and in a known structure. The seat 200 is arranged at a predetermined distance inward in the vehicle width direction from the passenger compartment inner wall 100, and a space (hereinafter referred to as a "space between the seat 200 and the passenger compartment inner wall 100") is formed between a side surface on the outer side in the vehicle width direction of the seat 200 and the passenger compartment inner wall 100 opposed to the side surface. As a result of providing the space, a space (hereinafter referred to as a "space between the occupant M and the passenger compartment inner wall 100") is also formed between a side surface on the outer side in the vehicle width direction of the occupant M seated on the seat 200 and the passenger compartment inner wall 100. The space between the seat 200 and the passenger compartment inner wall 100 is appropriately designed so that the occupant M can ride safely and comfortably regardless individual differences of the occupant M such as a physique and a sitting posture.

The seat 200 includes a seat cushion 210 that is a seated part of the occupant M, a seat back 220 that is a backrest part for the occupant M arranged to stand at a rear end of the seat cushion 210 and a head restraint 230 that is a head protecting part for the occupant M disposed at an upper end of the seat back 220.

The seat cushion 210, the seat back 220 and the head restraint 230 can be formed of known materials and in a known structure. The seat cushion 210 has a known slide mechanism and is attached to the vehicle floor 3 of the passenger compartment 2 slidably in the front-back direction. Accordingly, the occupant M can adjust the position of the seat cushion 210 as appropriate so that a sitting posture suitable for his/her physique can be obtained. The seat back 220 has a known recliner mechanism and is attached to the seat cushion 210 in a manner that the angle can be changed in the front-back direction. The head restraint 230 also has a known height mechanism and is attached to the seat back 220 in a manner that the height thereof can be changed in the vertical direction. These various mechanisms of the seat 200 allows the shape of the seat 200 to be appropriately adjusted, and the occupant M can thus sit on the seat 200 in a suitable posture.

The seat cushion 210 includes a seat bearing face part 211 having a seated surface on which the occupant M is seated and supporting the buttocks of the seated occupant M, and a side support part 212 having a shape raised upward at a right side portion and a left side portion of the seat bearing face part 211 and supporting the lumbar of the occupant M in the vehicle width direction. The seat back 220 includes a seat back part 221 having a backrest surface for the occupant M and supporting the back of the seated occupant M, and a side support part 222 having a shape raised frontward at a right side portion and a left side portion of the seat back part 221 and supporting the lumbar of the occupant M in the vehicle width direction. The head restraint 230 supports the head of the occupant M. A height H1 of the seat cushion 210 is a height from the vehicle floor 3 to the upper surface of the seat bearing face part 211.

Figure 3:
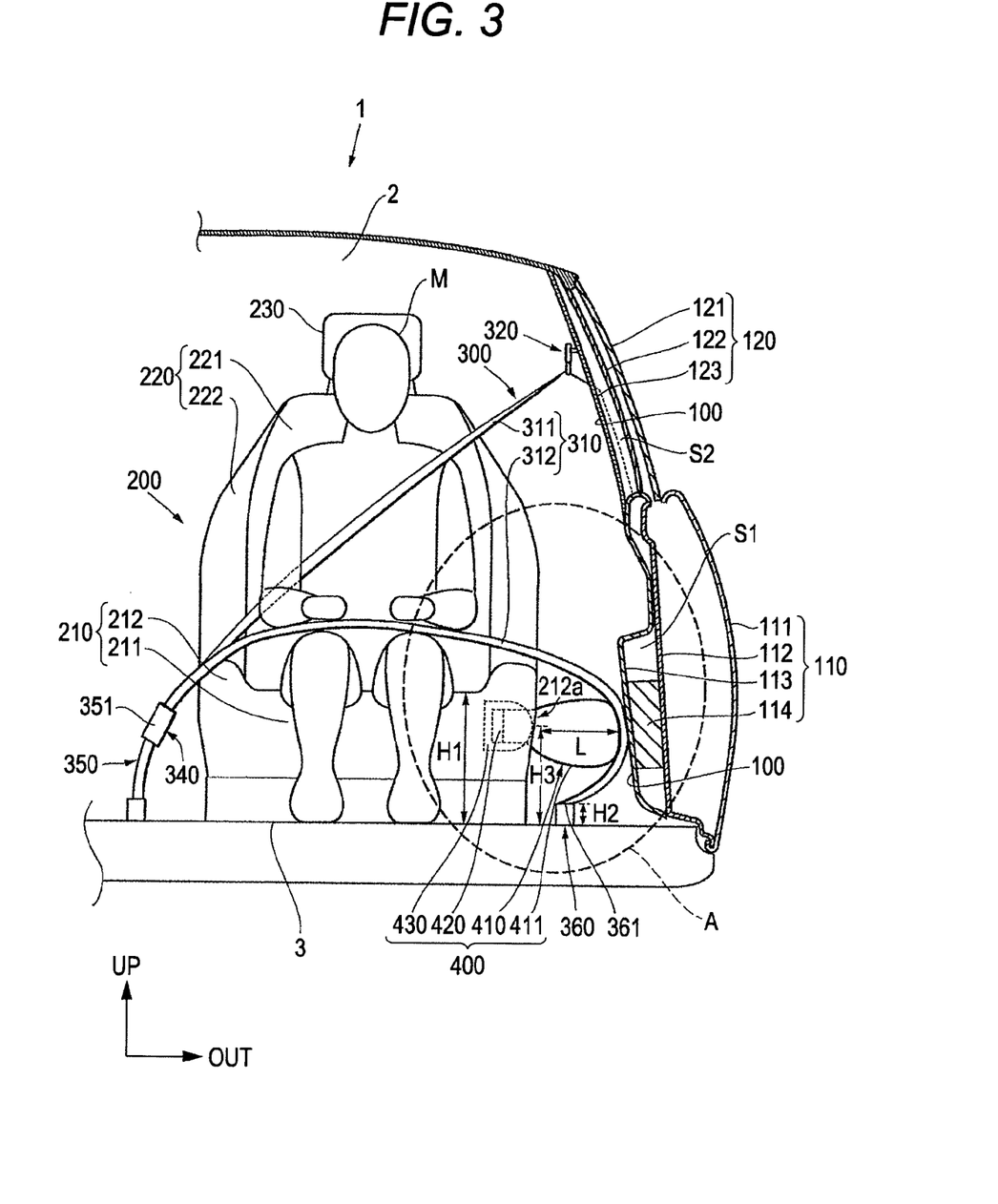
FIG. 3 is a front view schematically showing a structure inside the passenger compartment of the vehicle in which the occupant protection apparatus according to the embodiment of the present invention is employed in a state after operation of the side airbag device as viewed from the front side of the vehicle.
Figure 4:
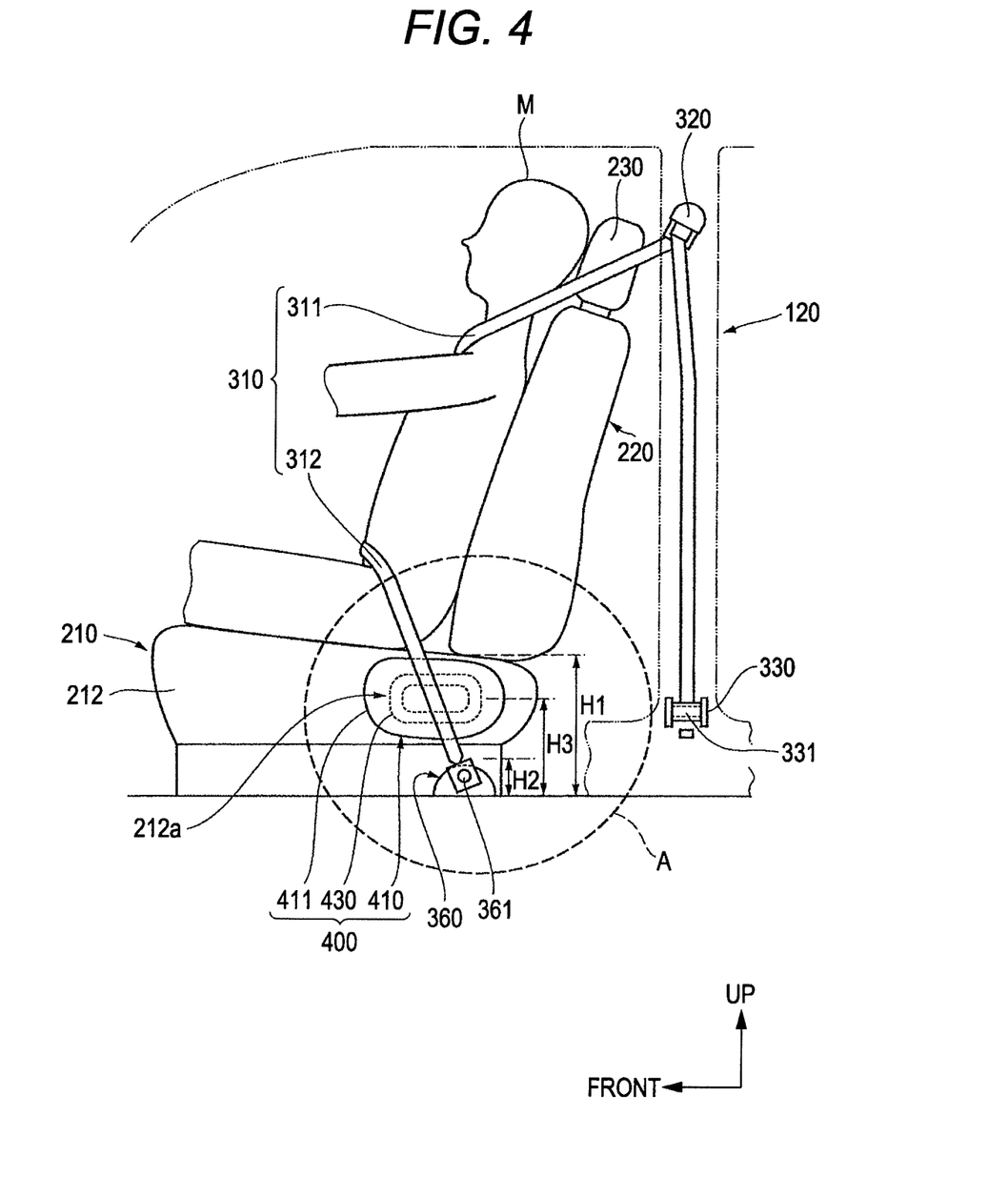
FIG. 4 is aside view schematically showing the structure inside the passenger compartment of the vehicle in which the occupant protection apparatus according to the embodiment of the present invention is employed in the state after operation of the side airbag device as viewed from the side of the vehicle.

Next, structures of the seat belt device 300 and the side airbag device 400 included in the occupant protection apparatus of the present embodiment will be described with reference to FIGS. 1 to 4. FIG. 3 is a front view schematically showing a structure inside the passenger compartment 2 of the vehicle in which the occupant protection apparatus according to the embodiment of the present invention is employed in a state after operation of the side airbag device 400 included in the occupant protection apparatus as viewed from the front side of the vehicle. FIG. 4 is a side view schematically showing the structure inside the passenger compartment 2 of the vehicle in which the occupant protection apparatus according to the embodiment of the present invention is employed in the state after operation of the side airbag device 400 included in the occupant protection apparatus as viewed from the side of the vehicle.

The seat belt device 300 is a so-called three-point seat belt device and can be made of known materials and in a known structure. The seat belt device 300 includes a band-like seat belt 310 that comes in direct contact with the occupant M to restrain the occupant M, and a retractor 330 that accommodates one end of the seat belt 310 in a manner that the seat belt 310 can be pulled out via a guide 320. The seat belt device 300 also includes a buckle 350 to lock the seat belt 310 into the vehicle floor 3 on the right side of the occupant M via a tongue 340 disposed movably at a center portion in the longitudinal direction of the seat belt 310, and an anchor 360 to lock another end of the seat belt 310 to the vehicle floor 3 on the left side of the occupant M.

The guide 320 is disposed at an upper portion of the center pillar 120 above the seat back 220. The guide 320 guides the seat belt 310 extending from the retractor 330 along the center pillar 120 to above the seat back 220. The guide 320 then slidably holds the seat belt 310 at the upper portion of the center pillar 120 and turns the seat belt 310 toward the seat back 220. In addition, the guide 320 makes the seat belt 310 extend from the upper portion of the center pillar 120 downward at an angle inward in the vehicle width direction.

The retractor 330 is attached in the region S2 formed between the inner panel 122 and the pillar trim 123 of the center pillar 120, and biases the seat belt 310 to take up the seat belt 310. The retractor 330 includes a pretensioner 331. The pretensioner 331 pulls the seat belt 310 into the retractor 330 so as to increase the restraint of the seat belt 310 to the occupant M in the event of side impact. The pretensioner 331 includes a mechanism for instantly taking up the seat belt 310 and a locking mechanism (not shown) with a force limiter.

The tongue 340 has a substantially T-shape and the seat belt 310 extending from the guide 320 toward the seat back 220 passes therethrough. The tongue 340 is removably engaged with the buckle 350 fixed to the vehicle floor 3 on the inner side in the vehicle width direction of the seat cushion 210. When the tongue 340 is engaged with the buckle 350, the tongue 340 allows the seat belt 310 extending from the guide 320 to extend along a front surface of the seat back 220 from thereabove toward therebelow at an angle inward in the vehicle width direction. At this time, the seat belt 310 extends downward across the front surface of the seat back 220 and comes in contact with the breast of the occupant M.

Note that the buckle 350 is fixed to the vehicle floor 3 on the inner side in the vehicle width direction of the seat cushion 210 in a manner that the buckle 350 can turn in the front-back direction. An engagement portion 351 of the buckle 350 with which the tongue 340 is engaged is arranged below the height of the upper surface of the seat bearing face part 211. Specifically, the buckle 350 engages with the seat belt 310 through the tongue 340 below the height of the upper surface of the seat bearing face part 211 in a manner that the buckle 350 can turn in the front-back direction. The buckle 350 is also fixed to the vehicle floor 3 on the rear end side of the seat cushion 210, that is, on the side of the boundary with the seat back 220.

Specifically, the seat belt 310 extending downward across the front surface of the seat back 220 extends across the rear end side of the side portion of the seat cushion 210 on the inner side in the vehicle width direction and is engaged with the buckle 350 through the tongue 340 when the seat cushion 210 is viewed from the side in the direction from the inner side to the outer side in the vehicle width direction.

When the tongue 340 is engaged with the buckle 350, the tongue 340 slidably holds the seat belt 310 extending across a side portion on the inner side in the vehicle width direction of the seat cushion 210 at the position of the engagement portion 351 and turns the seat belt 310 toward the anchor 360 fixed to the vehicle floor 3 on the outer side in the vehicle width direction of the seat cushion 210. The tongue 340 makes the seat belt 310 extend outward in the width direction from the position of the engagement portion 351, that is, the position of the vehicle floor 3 on the inner side in the vehicle width direction of the seat cushion 210. In this state, the seat belt 310 extends outward in the vehicle width direction across the upper surface of the seat cushion 210 and comes in contact with the abdominal and the lumbar of the occupant M.

When the seat belt 310 extends across the upper surface of the seat cushion 210 outward in the vehicle width direction, it is locked by the anchor 360. The anchor 360 is fixed to the vehicle floor 3 on the outer side in the vehicle width direction of the seat cushion 210 in a manner that the anchor 360 can turn in the front-back direction. The seat belt 310 is locked is at a height H2 of a locking portion 361 of the anchor 360. The height H2 is lower than the height H3 of a side support side portion 212a that will be described later. Specifically, the anchor 360 locks the seat belt 310 at a position lower than a height H3 of the side support side portion 212a described later in a manner that the anchor 360 can turn in the front-back direction. The anchor 360 is also fixed to the vehicle floor 3 on the rear end side of the seat cushion 210, that is, on the side of the boundary with the seat back 220.

Specifically, the seat belt 310 extending across the upper surface of the seat cushion 210 outward in the vehicle width direction extends across the rear end side of the side portion of the seat cushion 210 on the outer side in the vehicle width direction from thereabove to therebelow and is locked to the anchor 360 when the seat cushion 210 is viewed from the side in the direction from the outer side to the inner side in the vehicle width direction. In addition, the seat belt 310 extending across the upper surface of the seat cushion 210 outward in the vehicle width direction extends across the space between the seat 200 and the passenger compartment inner wall 100 from the inner side to the outer side in the vehicle width direction and locked to the anchor 360 when the seat cushion 210 is viewed from the front in the direction from the front to the back of the vehicle.

In this manner, part of the seat belt 310 (hereinafter referred to as a "shoulder belt 311") extending from the guide 320 to the tongue 340 comes in contact with the shoulder and the breast of the occupant M, and part of the seat belt 310 (hereinafter referred to as a "lap belt 312") extending from the tongue 340 to the anchor 360 comes in contact with the abdominal and the lumbar of the occupant M. Since one end of the shoulder belt 311 is biased by the retractor 330, a tension is applied to the shoulder belt 311, and the back of the occupant M is restrained against the seat back 220. In addition, since the lap belt 312 is integrated with the shoulder belt 311 and passes through the tongue 340, a tension is also applied to the lap belt 312 and the lumbar of the occupant M is restrained against the seat cushion 210. The lengths of the shoulder belt 311 and the lap belt 312 can be changed as appropriate. In the event of side impact, the pretensioner 331 is activated to increase the tensions of the shoulder belt 311 and the lap belt 312, which further increases the restraint to the occupant M.

The side airbag device 400 includes an airbag 410 that is deployed in the space between the side surface of the seat 200 on the outer side in the vehicle width direction and the passenger compartment inner wall 100 opposed to the side surface, and an inflator 420 that is activated in the event of side impact to deploy the airbag 410 by instantly supplying gas thereto. In the side airbag device 400 before being activated, the airbag 410 in a folded state is unitized with the inflator 420 and these are accommodated in a case 430. The side airbag device 400 can also be formed of known materials and in a known structure.

The case 430 of the side airbag device 400 is disposed inside the seat cushion 210 and on the rear end side of the side portion of the seat cushion 210 on the outer side in the vehicle width direction. Specifically, the case 430 is disposed at the side portion of a side support part 212 of the seat cushion 210 on the outer side in the vehicle width direction at the rear end side in the front-back direction (hereinafter referred to as "the side support side portion 212a").

The height H3 of the side support side portion 212a is lower than the height H1 of the seat cushion 210 and higher than the height H2 of the locking portion 361 of the anchor 360. Specifically, the side support side portion 212a is located at a position that overlaps with the lap belt 312 extending toward the anchor 360 when the seat cushion 210 is viewed from the side in the direction from the outer side to the inner side in the vehicle width direction. The airbag 410 accommodated in the case 430 arranged at the side support side portion 212a comes in contact with the lap belt 312 when the airbag 410 is deployed.

A slit (not shown) that is easily opened by a deploying pressure of the airbag 410 is formed in the side support side portion 212a, and the case 430 of the side airbag device 400 can be accommodated inside the slit. The case 430 is accommodated outward in the vehicle width direction with an ejection port (not shown) thereof facing the slit. The ejection port of the case 430 is adapted to open instantly by the deploying pressure of the airbag 410 when gas is supplied to the airbag 410. The airbag 410 and the inflator 420 are arranged in this order in the case 430 from the side adjacent to the ejection port, that is, from the outer side toward the inner side in the vehicle width direction.

The airbag 410 can be folded substantially in a form of bellows, for example, before being deployed and is a bag made of cloth that can be inflated substantially elliptically in cross section, for example. The size of the airbag 410 is set such that the length in the deploying direction after being deployed is larger than the distance between the side surface of the seat 200 on the outer side in the vehicle width direction and the passenger compartment inner wall 100 and that the width in the front-back direction of a cross section is larger than the width of the lap belt 312. An opening (not shown) of the airbag 410 is arranged in the case 430 to face inward in the vehicle width direction and connected to a gas supply port (not shown) of the inflator 420 so that the airbag 410 is communicated with the inflator 420.

A deployed part 411 into which gas is filled within the airbag 410 and which is opposite to the opening in the deploying direction is disposed in the case 430 to face outward in the vehicle width direction. A deploying center of the deploying part 411 is arranged to be lower than the height H1 of the seat cushion 210 in the vertical direction, and preferably at a height substantially equal to the height H3 of the side support side portion 212a. The deploying center of the deploying part 411 is also arranged to overlap with a center of the width of the lap belt 312 extending toward the anchor 360 in the front-back direction.

The inflator 420 instantly controls the gas supply port to open and instantly supplies gas such as nitrogen based on a control signal from a sensor (not shown) mounted on the vehicle 1 for detecting the impact load in the event of side impact. The gas supply port of the inflator 420 is oriented outward in the vehicle width direction and communicated with the opening of the airbag 410. The gas pressure of the inflator 420 is set in advance so that the deploying pressure of the airbag 410 is sufficiently larger than a force pulling the seat belt 310 applied by the taking up operation of the retractor 330. Note that, even when the force pulling the seat belt 310 is increased by providing the pretensioner 331 in the retractor 330, the gas pressure of the inflator 420 is set so that the deploying pressure of the airbag 410 is sufficiently larger than the pulling force.

In the side airbag device 400 during operation, when the impact load in the event of side impact is detected by the sensor, the inflator 420 opens the gas supply port and supplies gas to the opening of the airbag 410. The airbag 410 to which gas is supplied starts being deployed to open the ejection port of the case 430 and is ejected outside from the case 430 outward in the vehicle width direction. The ejected airbag 410 is deployed from the side support side portion 212a through the slit outward in the vehicle width direction. At this time, the airbag 410 is deployed beyond the space between the seat 200 and the passenger compartment inner wall 100 while pressing the lap belt 312 of the seat belt 310 outward in the vehicle width direction. The airbag 410 after being deployed is in contact with the passenger compartment inner wall 100 to press the passenger compartment inner wall 100.

Figure 5:
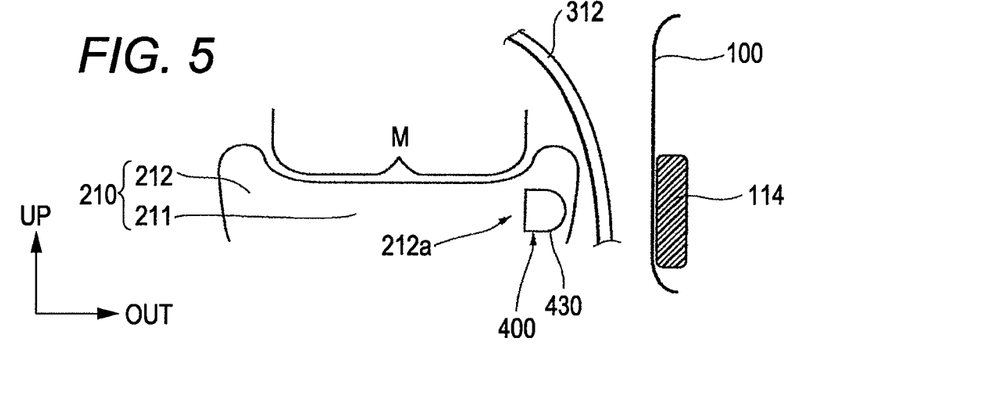
FIG. 5 is an enlarged schematic view of part A in FIG. 1 in the state before the side airbag device according to the embodiment of the present invention is activated.
Figure 6:
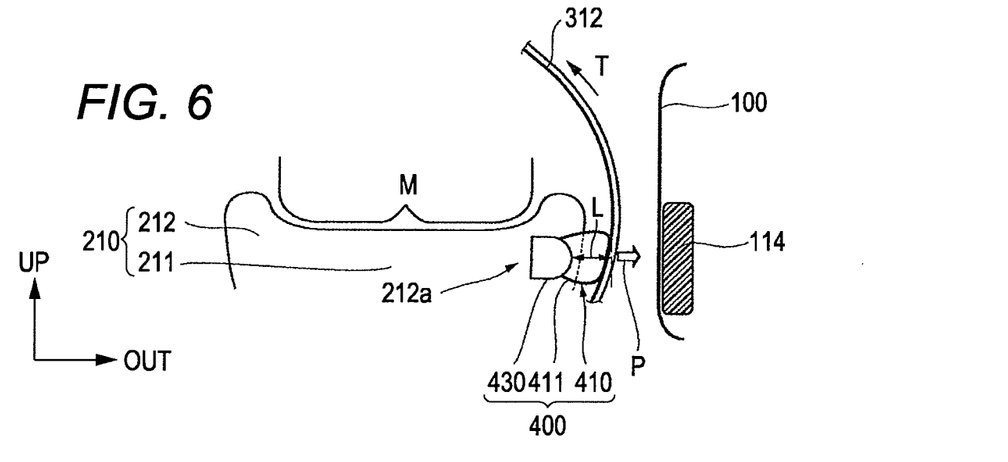
FIG. 6 is a schematic view showing a state during operation of the side airbag device according to the embodiment of the present invention.
Figure 7:
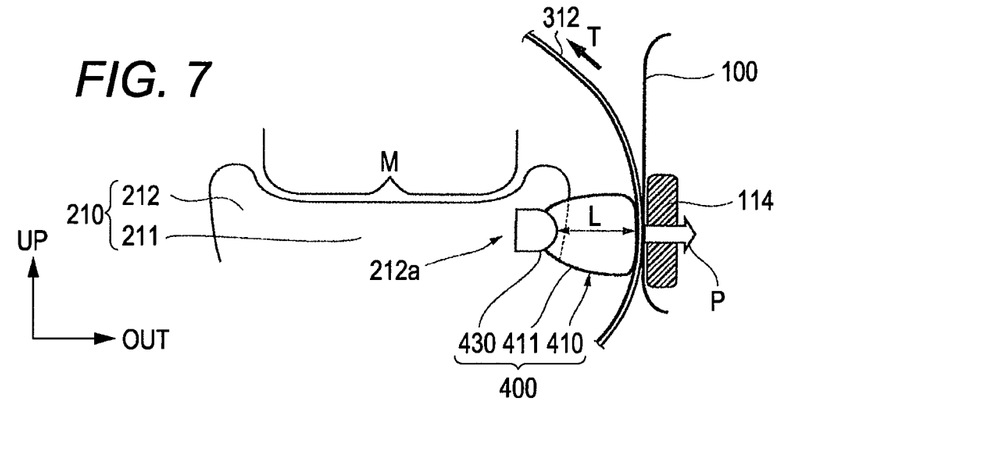
FIG. 7 is an enlarged schematic view of part A in FIG. 3 in the state after operation of the side airbag device according to the embodiment of the present invention.

Next, operations of the seat belt device 300 and the side airbag device 400 having the above-described structures will be described with reference to FIGS. 5 to 7. FIG. 5 is an enlarged schematic view of part A in FIG. 1 in the state before the side airbag device 400 according to the embodiment of the present invention is activated. FIG. 6 is a schematic view showing a state during operation of the side airbag device 400 according to the embodiment of the present invention. FIG. 7 is an enlarged schematic view of part A in FIG. 3 in the state after operation of the side airbag device 400 according to the embodiment of the present invention.

As shown in FIG. 5, a space is formed between the seat 200 and the passenger compartment inner wall 100, and the EA member 114 is disposed in the passenger compartment inner wall 100. The seat belt device 300 includes the lap belt 312 extending across the space between the seat 200 and the passenger compartment inner wall 100. The side airbag device 400 is disposed at the side support side portion 212a of the seat 200 and includes the airbag 410 that is deployed in the space between the seat 200 and the passenger compartment inner wall 100. The ejection port of the case 430 of the airbag 410 is oriented outward in the vehicle width direction so that the ejecting direction is outward in the vehicle width direction.

In the event of side impact, the side airbag device 400 is activated, the airbag 410 is ejected from the case 430 outward in the vehicle width direction, and starts to deploy in the space between the seat 200 and the passenger compartment inner wall 100 from the side support side portion 212a outward in the vehicle width direction as shown in FIG. 6. At this time, the side support side portion 212a is at a position that overlaps with the lap belt 312 when the seat cushion 210 is viewed from the side in the direction from the outer side to the inner side in the vehicle width direction. Thus, the airbag 410 ejected outward in the vehicle width direction comes in contact with the lap belt 312 and starts deploying in the space between the seat 200 and the passenger compartment inner wall 100.

The airbag 410 has the deploying part 411 with a width in the front-back direction of a cross section larger than the width of the lap belt 312, and has the center of deployment overlapping with the center of the width of the lap belt 312 in the front-back direction. Accordingly, the airbag 410 that has started to deploy in the space between the seat 200 and the passenger compartment inner wall 100 is engaged with the lap belt 312 in contact therewith, and securely transmits the deploying pressure of the airbag 410 as a pressure P outward in the vehicle width direction to the lap belt 312.

The airbag 410 that has started to deploy attempts to move the lap belt 312 outward in the vehicle width direction by the pressure P outward in the vehicle width direction. On the other hand, when the pressure P is applied to the lap belt 312 by the airbag 410, the seat belt device 300 attempts to take up the shoulder belt 311 that is integrated with the lap belt 312 by means of the retractor 330 as a reaction thereto. Due to the pulling force at the time of the taking up operation of the retractor 330, a tension T is applied not only to the shoulder belt 311 but also to the lap belt 312 integrated with the shoulder belt 311.

The restraints of the shoulder belt 311 and the lap belt 312 to the occupant M against the seat 200 can be increased by the tension T applied thereto. Thus, the occupant M can be protected so that the occupant M does not break away from the seat 200 by the shoulder belt 311 and the lap belt 312 (namely, the seat belt 310) with increased restraints against the seat 200.

The gas pressure of the inflator 420 connected with the airbag 410 is set in advance so that the deploying pressure of the airbag 410 is sufficiently larger than the pulling force of the retractor 330. The deploying airbag 410 applies the pressure P that is larger than the pulling force of the retractor 330 to the lap belt 312. Accordingly, the airbag 410 can deploy in the space between the seat 200 and the passenger compartment inner wall 100 while moving the lap belt 312 by pressing the lap belt 312 outward in the vehicle width direction.

The retractor 330 includes the pretensioner 331, which increases the pulling force of the retractor 330 to increase the tension T. In the present embodiment, the gas pressure of the inflator 420 is set in advance so that the deploying pressure of the airbag 410 is sufficiently larger than the pulling force increased by the pretensioner 331. The deploying airbag 410 can move the lap belt 312 outward in the vehicle width direction while further increasing the tension T increased by the pulling force of the retractor 330. In other words, the side airbag device 400 of the present embodiment can enhance the function of the pretensioner 331 of increasing the pulling force of the retractor 330 to increase the restraint of the seat belt 310.

In addition, since the airbag 410 deploys in the space between the seat 200 and the passenger compartment inner wall 100 from the side support side portion 212a outward in the vehicle width direction, a space corresponding to the deploying length L in the vehicle width direction of the deploying part 411 of the airbag 410 can be secured on the outer side in the vehicle width direction of the side support side portion 212a. Therefore, in the case where the front door 110 and the center pillar 120 are deformed inward in the vehicle width direction and the passenger compartment inner wall 100 comes into the passenger compartment 2 (in the case where the space between the seat 200 and the passenger compartment inner wall 100 is narrowed) due to the impact load in the event of side impact, the airbag 410 can hold back the incoming passenger compartment inner wall 100 near a position at the deploying length L.

Specifically, the side airbag device 400 of the present embodiment can prevent the space between the seat 200 and the passenger compartment inner wall 100 from narrowing using the deploying length L of the deploying part 411, whereby the space between the occupant M and the passenger compartment inner wall 100 can be secured. In addition, the side airbag device 400 of the present embodiment can protect the occupant M in a manner that the passenger compartment inner wall 100 coming into the passenger compartment 2 is prevented from being in direct contact with the occupant M.

As described above, in the present embodiment, the side airbag device 400 having the above-described structure is provided. Accordingly, the airbag 410 at deployment is deployed in the space between the seat 200 and the passenger compartment inner wall 100 while pressing the seat belt 310 outward in the vehicle width direction. It is therefore possible to secure the space between the occupant M and the passenger compartment inner wall 100 at the deploying length L of the airbag 410 and to increase the restraint to the occupant M against the seat 200 by applying the tension T to the seat belt 310.

Therefore, the present embodiment can implement the functions of protecting the occupant M from the passenger compartment inner wall 100 coming into the passenger compartment 2 due to the impact load in the event of side impact and protecting the occupant M by preventing the occupant M from braking away from the seat 200 by increasing the restraint of the seat belt 310 by one side airbag device 400.

In the present embodiment, the deploying center of the airbag 410 is set to be lower than the height H1 of the seat cushion 210, and preferably at a height substantially equal to the height H3 of the side support side portion 212a. Thus, the airbag 410 ejected outward in the vehicle width direction can be deployed in the space between the seat 200 and the passenger compartment inner wall 100 without causing the deploying part 411 to come into contact with the occupant M.

Typically, if the deployed side airbag is to be in contact with the occupant, it is possible to secure the space between the occupant and the passenger compartment inner wall by directly wrapping the occupant with the side airbag and to increase the restraint of the seat belt. In this case, however, the deploying pressure of the side airbag needs to be finely controlled. This is because the deploying pressure of the side airbag is relatively large and thus needs to be controlled in a suppressive manner so as not to damage the occupant by the deploying pressure.

Accordingly, the side airbag of the related art that comes in contact with the occupant requires means for finely controlling the deploying pressure, providing a plurality of airbags to quickly protect the occupant, or additionally providing a mechanism for increasing the restraint against the seat so as to compensate for the suppressive deploying pressure, or additionally providing a mechanism for moving the seat itself inward in the vehicle width direction to secure the space between the occupant and the passenger compartment inner wall, for example. Thus, the side airbag of the related art that comes in contact with the occupant needs to be sophisticated and complicated so as to securely protect the occupant, which has been a great burden to manufacturers.

In the present embodiment, on the other hand, the space between the occupant M and the passenger compartment inner wall 100 is secured at the deploying length L of the airbag 410 without causing the airbag 410 to come into contact with the occupant M, and the restraint to the occupant M against the seat 200 is increased by applying the tension T to the seat belt 310.

Therefore, since the present embodiment can further increase the deploying pressure of the airbag 410 without sophisticating or complicating the device, the airbag 410 can be deployed in a shorter time and the occupant M can be protected more quickly. In this case, the deploying part 411 of the airbag 410 can be made relatively smaller because the airbag 410 is not to come in contact with the occupant M, and the side airbag device 400 can thus be made smaller.

In the present embodiment, the side airbag device 400 is disposed at the side support side portion 212a that is a side portion on the outer side in the vehicle width direction of the side support part 212. The inside of the side support part 212 is relatively often a dead space. Thus, as a result of providing the side airbag device 400 at the side support part 212, the design freedom of the seat 200 can be increased.

Then, the airbag 410 further deploys across the space between the seat 200 and the passenger compartment inner wall 100 while pressing the lap belt 312 outward in the vehicle width direction as shown in FIG. 7. It is assumed here that the length in the deploying direction of the airbag 410 after deployment of the airbag is set to be sufficiently larger than the distance between the seat 200 and the passenger compartment inner wall 100. It is also assumed that the gas pressure of the inflator 420 is set to be sufficiently larger than the pulling force of the retractor 330. Then, the airbag 410 can deploy across the space between the seat 200 and the passenger compartment inner wall 100 while pressing the lap belt 312 outward in the vehicle width direction until the airbag 410 presses the passenger compartment inner wall 100.

The airbag 410 deployed until the airbag 410 presses the passenger compartment inner wall 100 allows the lap belt 312 to be held between the passenger compartment inner wall 100 and the airbag 410 in a state the tension T is applied thereto by the pressure P of the airbag 410 pressing the passenger compartment inner wall 100 and a reaction force against the pressure P from the passenger compartment inner wall 100. That is, the side airbag device 400 of the present embodiment can maintain the restraint of the seat belt 310 increased by applying the tension T and can further reliably prevent the occupant M from breaking away.

Moreover, since the airbag 410 can deploy outward in the vehicle width direction until the airbag 410 presses the passenger compartment inner wall 100, the deploying length L of the airbag 410 is increased. As a result, it is possible to further reliably prevent the space between the seat 200 and the passenger compartment inner wall 100 from narrowing and to further reliably secure the space between the occupant M and the passenger compartment inner wall 100. Since the airbag 410 presses the passenger compartment inner wall 100, it is possible to directly receive the force of the passenger compartment inner wall 100 coming into the passenger compartment 2 by the airbag 410, and to stably prevent the passenger compartment inner wall 100 from coming in.

Moreover, in the present embodiment, the EA member 114 is disposed on the outer side in the vehicle width direction of the passenger compartment inner wall 100 at a position corresponding to the height H3 and the position in the front-back direction of the side support side portion 212a. Specifically, the EA member 114 serves to buffer the external force applied from the outer side to the inner side in the vehicle width direction due to the impact load in the event of side impact, and in addition, serves as a receiving part that receives the pressure P of the deployed airbag 410.

Therefore, The present embodiment can make the external force causing the passenger compartment inner wall 100 to come into the passenger compartment 2 smaller by providing the EA member 114. As a result, it is possible to further reliably prevent the space between the seat 200 and the passenger compartment inner wall 100 from narrowing and to further secure the space between the occupant M and the passenger compartment inner wall 100. In addition, by providing the EA member 114, the range of the pressure P that can be received by the passenger compartment inner wall 100 is expanded and the deploying pressure of the airbag 410 can be set to be relatively high. Accordingly, the airbag 410 can be deployed in a shorter time and the occupant M can be protected more quickly. The design of the gas pressure of the inflator 420 and the design of the shape of the airbag 410 are facilitated.

The present invention can be modified in various designs as far as there is no particular contradiction or problem in objects and configurations thereof. For example, although the occupant protection apparatus is applied to the seat 200 as a front passenger seat of a right-hand drive vehicle in the present embodiment, the present invention is not limited thereto and may also be applied to a driver seat or a backseat, or to a left-hand drive vehicle. Moreover, although a three-point seat belt device is used for the seat belt device 300 described in the illustrated embodiment, the present invention is not limited thereto, and a two-point seat belt device or the like may be used. Moreover, although the pretensioner 331 is provided at the retractor 330 in the present embodiment, the present invention is not limited thereto. Alternatively, for example, the pretensioner 331 may be provided at the anchor 360 or the buckle 350, or a plurality of pretensioners may be provided.

In addition, although the side airbag device 400 is provided at the side support side portion 212a of the side support part 212 included in the seat cushion 210 in the present embodiment, the present invention is not limited thereto. Alternatively, for example, the side airbag device 400 may be provided at a side portion on the outer side in the vehicle width direction of the seat bearing face part 211 of the seat cushion 210 that is a position overlapping with the lap belt 312 when the seat cushion 210 is viewed from the side in the direction from the outer side to the inner side in the vehicle width direction. If the seat belt 310 can be pressed outward in the vehicle width direction by the airbag 410, the side airbag device 400 may be disposed at a side portion on the outer side in the vehicle width direction of the seat back 220.

Moreover, although the buckle 350 and the anchor 360 are fixed to the vehicle floor 3 in the present embodiment, the present invention is not limited thereto, and the buckle 350 and the anchor 360 may be attached to the seat 200 and slidably integrated with the seat 200 by using the slide mechanism of the seat 200. In this manner, since the position of the seat belt 310 relative to the side airbag device 400 is not changed, the airbag 410 at the time of deployment can press the lap belt 312 more securely, which further improves the effect of increasing the restraint of the seat belt 310 of the present embodiment.

What is claimed is:

1. An occupant protection apparatus comprising:
    a side airbag device including an airbag that deploys in a space between a side surface on an outer side in a vehicle width direction of a seat and a passenger compartment inner wall facing the side surface at a vehicle side impact; and
    a seat belt device including a seat belt that restrains an occupant seated on the seat, wherein
    the side airbag device is provided at a side portion on an outer side in the vehicle width direction of the seat and on an inner side in the vehicle width direction of the seat belt, and
    the airbag is ejected outward in the vehicle width direction at a vehicle side impact, deploys in the space to secure a space between the passenger compartment inner wall and the occupant, and presses the seat belt outward in the vehicle width direction to apply a tension to the seat belt, and
    wherein said airbag device is configured to avoid airbag contact with the seated occupant upon full deployment.

2. The occupant protection apparatus according to claim 1, wherein
    when deployed, the airbag comes into contact with the passenger compartment inner wall and brings the pressed seat belt into contact with the passenger compartment inner wall to hold the seat belt between the airbag and the passenger compartment inner wall.

3. The occupant protection apparatus according to claim 2, wherein the passenger compartment inner wall includes a receiving part that receives a load applied by the airbag in contact with the passanger compartment inner wall.

4. The occupant protection apparatus according to claim 3, wherein the receiving part is made of a shock absorbing material for absorbing an impact load at a vehicle side impact.

5. The occupant protection apparatus according to claim 1, wherein
    the seat includes a seat cushion having a seat bearing face part and a side support part of the seat bearing face part, and
    the side airbag device is disposed at a side portion on an outer side in the vehicle width direction of the seat bearing face part or the side support part, and a deployment center of the airbag included in the side airbag device is disposed lower than the seat bearing face part or the side support part in the passenger compartment.

6. The occupant protection apparatus according to claim 1, further comprising a means for energy absorption supported adjacent the passenger compartment inner wall and wherein the energy absorption means is positioned at a height substantially equal to a height of a deployment center of the airbag.

7. An occupant protection apparatus comprising:
    a side airbag device including an airbag that deploys in a space between a side surface on an outer side in a vehicle width direction of a seat and a passenger compartment inner wall facing the side surface at a vehicle side impact; and
    a seat belt device including a seat belt, that restrains an occupant seated on the seat, wherein
    the side airbag device is provided at a side portion on an outer side in the vehicle width direction of the seat and on an inner side in the vehicle width direction of the seat belt, and the airbag is ejected outward in the vehicle width direction at a vehicle side impact, deploys in the space to secure a space between the passenger compartment inner wall and the occupant, and presses the seat belt outward in the vehicle width direction to apply a tension to the seat belt, wherein when deployed, the airbag comes into contact with the passenger compartment inner wall and brings the pressed seat belt into contact with the passenger compartment inner wall to hold the seat belt between the airbag and the passenger compartment inner wall.

8. The occupant protection apparatus according to claim 7, wherein the passenger compartment inner wall includes a receiving part that receives a load applied by the airbag in contact thereto.

9. The occupant protection apparatus according to claim 8, wherein the receiving part is made of a shock absorbing material for absorbing an impact load at a vehicle side impact.

10. The occupant protection apparatus according to claim 7, wherein the seat includes a seat cushion having a seat bearing face part and a side support part of the seat bearing face part, and the side airbag device is disposed at a side portion on an outer side in the vehicle width direction of the seat bearing face part or the side support part, and a deployment center of the airbag included in the side airbag device is disposed lower than the seat bearing face part or the side support part in the passenger compartment.

11. The occupant protection apparatus according to claim 8, wherein the seat includes a seat cushion having a seat bearing face part and a side support part of the seat bearing thee part, and the side airbag device is disposed at a side portion on an outer side in the vehicle width direction of the seat bearing face part or the side support part, and a deployment center of the airbag included in the side airbag device is disposed lower than the seat bearing face part or the side support part in the passenger compartment.

12. The occupant protection apparatus according to claim 9, wherein the seat includes a seat cushion having a seat bearing face part and a side support part of the seat bearing face part, and the side airbag device is disposed at a side portion on an outer side in the vehicle width direction of the seat bearing face part or the side support part, and a deployment center of the airbag included in the side airbag device is disposed lower than the seat bearing face part or the side support part in the passenger compartment.

13. The occupant protection apparatus according to claim 9, wherein said airbag has a deployment center substantially at a common height with said receiving part.

14. An occupant protection apparatus comprising:

a side airbag device including an airbag that deploys in a space between a side surface on an outer side in a vehicle width direction of a seat and a passenger compartment inner wall facing the side surface at a vehicle side impact; and a seat belt device including a seat belt that restrains an occupant seated on the seat, wherein the side airbag device is provided at a side portion on an outer side in the vehicle width direction of the seat and on an inner side in the vehicle width direction of the seat belt, and the airbag is ejected outward in the vehicle width direction at a vehicle side impact, deploys in the space to secure a space between the passenger compartment inner wall and the occupant, and presses the seat belt outward in the vehicle width direction to apply a tension to the seat belt, wherein the seat includes a seat cushion having a seat bearing face part and a side support part of the seat bearing face part, and the side airbag device is disposed at a side portion on an outer side in the vehicle width direction of the seat bearing face part or the side support part, and a deployment center of the airbag included in the side airbag device is disposed lower than the seat bearing face part or the side support part in the passenger compartment.

15. The occupant protection apparatus according to claim 14, wherein when deployed, the airbag comes into contact with the passenger compartment inner wall and brings the pressed seat belt into contact with the passenger compartment inner wall to hold the seat belt between the airbag and the passenger compartment inner wall.

16. The occupant protection apparatus according to claim 15, wherein the passenger compartment inner wall includes a receiving part that receives a load applied by the airbag in contact thereto.

17. The occupant protection apparatus according to claim 16, wherein the receiving part is an energy absorption member for absorbing an impact load at a vehicle side impact.

18. The occupant protection apparatus according to claim 14, further comprising a shock absorption member supported adjacent the passenger compartment inner wall and wherein the shock absorbing member is at a height substantially equal to a height of the deployment center of the airbag.

* * * * *